US005117107A

United States Patent [19]

Guilhaus et al.

[11] Patent Number: 5,117,107

[45] Date of Patent: May 26, 1992

[54] MASS SPECTROMETER

[75] Inventors: Michael Guilhaus, Randwick; John H. Dawson, Potts Point, both of Australia

[73] Assignee: Unisearch Limited, New South Wales, Australia

[21] Appl. No.: 477,921

[22] PCT Filed: Dec. 23, 1988

[86] PCT No.: PCT/AU88/00498

§ 371 Date: Jul. 19, 1990

§ 102(e) Date: Jul. 19, 1990

[87] PCT Pub. No.: WO89/06044

PCT Pub. Date: Jun. 29, 1989

[30] Foreign Application Priority Data

Dec. 24, 1987 [AU] Australia ............................... PI6079

[51] Int. Cl.[5] ........................ B01D 59/44; H01J 49/00

[52] U.S. Cl. ...................................... 250/287; 250/281

[58] Field of Search ............... 250/281, 287, 296, 297, 250/397

[56] References Cited

U.S. PATENT DOCUMENTS

| | | | |
|---|---|---|---|
| 2,938,116 | 5/1960 | Benson et al. . | |
| 3,576,992 | 5/1971 | Moorman et al. . | |
| 3,986,111 | 10/1976 | Sellers | 250/287 |

FOREIGN PATENT DOCUMENTS

| | | | |
|---|---|---|---|
| 1063834 | 8/1959 | Fed. Rep. of Germany . | |
| 780999 | 8/1957 | United Kingdom | 250/287 |
| 1302193 | 1/1973 | United Kingdom . | |

*Primary Examiner*—Bruce C. Anderson

*Attorney, Agent, or Firm*—Morrison & Foerster

[57] ABSTRACT

A time of flight mass spectrometer includes an ion source (10) a lens system (18, 19) to focus the ions into a beam (21), an orthogonal accelerator (22) comprising two parallel electrodes one of which is a grid through which ions are deflected into a main accelerator and into a flight tube (26). At the distal end of the flight tube (26) is located an ion detector (27) which enables the measurement of the time of flight of ions from the orthogonal accelerator (22) to the detector (27).

5 Claims, 2 Drawing Sheets

MASS SPECTROMETER

The present invention relates generally to the field of Mass Spectrometry, and in particular the invention provides an improved Time-of-Flight (TOF) Mass Spectrometer.

Time-of-Flight mass spectrometers have generally employed one of three different means of ion formation:

a) electron impact ionisation of a gaseous sample;

b) californium fission fragment ionisation of a solid sample; and c) laser desorption.

In prior art TOF mass spectrometers the first of these methods, when employed, suffers from an inherently limited mass resolution caused by the formation of ions both over a significant region of space and having a spread of thermal energies. Each of these factors affect the time taken for ions to travel the length of the flight tube of the spectrometer and therefore affect the resolution of the instrument.

The remaining two methods, each work with solid samples and succeed in creating ions in a much better defined spatial plane. However, each of these methods still suffers from the problem of ion energy spread. The energy spread problem is usually compensated for by the use of a Reflectron (B. A. Mamyrin and D. V. Schmikk, Sov. Phys. JETP, 49, 762 [1979]) thereby obtaining better mass resolution. However this is of no avail for routine "gaseous" samples such as those derived from a Gas Chromatograph.

The present invention consists in a time-of-flight mass spectrometer comprising a source of ions, beam forming means to produce a substantially parallel beam of the ions generated by said source, an ion accelerator arranged to accelerate the ions of said beam in a direction orthogonal to the direction of the beam and means to measure the times of arrival of said ions at a target located at a predetermined distance from the accelerator, the accelerator comprising at least two parallel planar electrodes disposed about the path of said beam to define a first-stage acceleration chamber, at least one of the electrodes being a grid, and a pulsed voltage source connected between said electrodes such that when no voltage is applied the electrodes define a field free region and when a voltage pulse is applied between the electrodes an electric field will be generated and ions located between said electrodes will be accelerated orthogonally to the direction of the beam.

In a preferred embodiment of the invention, ions leaving the accelerator pass into a second-stage accelerator region having an electric field equal to that in the first-stage of the accelerator when the push-out pulse is applied to the parallel electrodes and then into a main accelerator region (third-stage) having a strong potential gradient to accelerate the ions toward the target.

Embodiments of the present invention may employ any of the prior art ion sources, including electron impact ionisation, chemical ionisation and fast atom bombardment sources.

Figure 1:
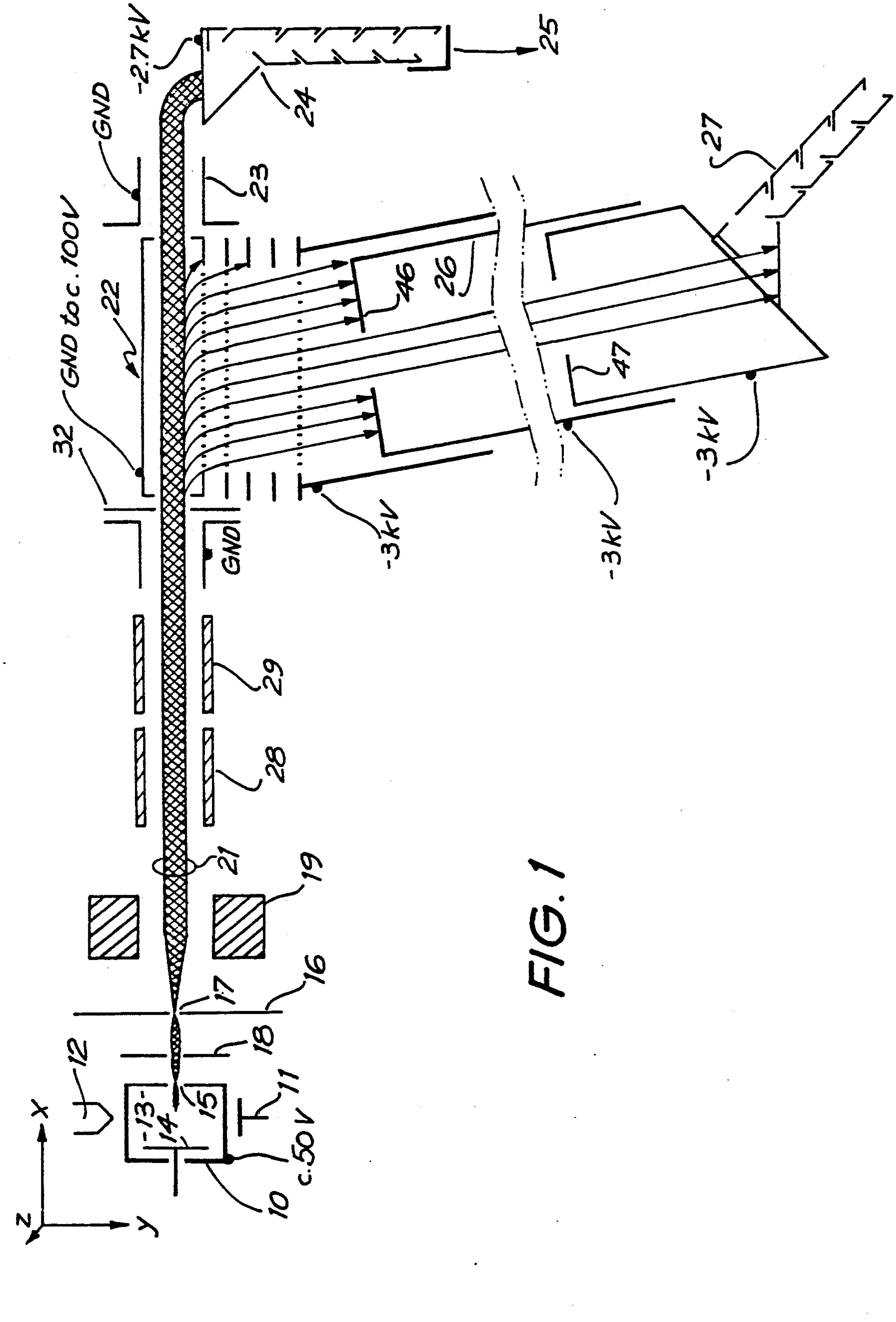
Figure 2:
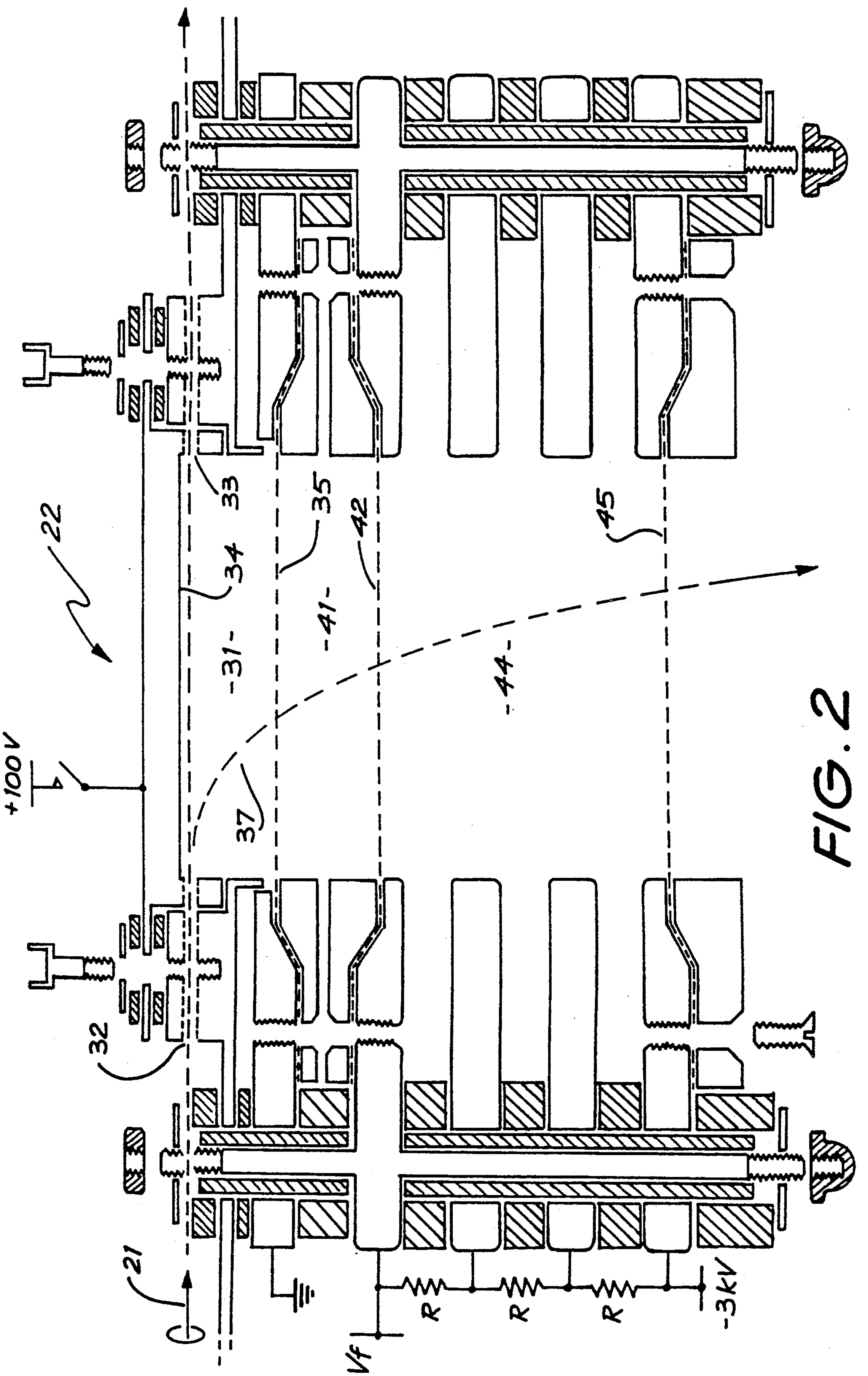

An embodiment of the invention will now be described with reference to the accompanying drawings in which:

FIG. 1 schematically illustrates a TOF mass spectrometer according to the present invention; and FIG. 2 schematically illustrates the orthogonal accelerator the stage-two region and the main accelerator of the embodiment of FIG. 1 in greater detail.

Referring to FIG. 1 the illustrated TOF Mass Spectrometer which is contained within a continuously pumped high vacuum housing, has an electron impact ionisation source 10 into which a gaseous sample is admitted. The source includes a heated cathode 12 to emit an electron beam through a sample chamber 13 to an anode (electron trap) 11 such that collisions between electrons and atoms of the sample gas within the chamber produce positive ions which are then repelled by a positively biased repeller 14, such that some of the ions will pass out through an aperture 15 as an ion leakage. While the cathode 12 and electron trap 11 are schematically illustrated as being above and below the source housing 10 they are in reality above and below the plane of the page. The source chamber is held at a positive voltage, e.g. +50 V. The differential pumping baffle 16 in which is placed the source slit 17 is held at a negative potential (e.g. −250 V), and the leaked ions are accelerated towards the baffle 16 and through the slit. A set of lenses 18 and 19, cooperate with the slit 17 to focus and deflect the ions into a parallel beam 21 which is directed towards an orthogonal accelerator 22 via the beam deflection region electrodes 28 and 29.

The voltage required to initiate the orthogonal acceleration of ions is pulsed, with ions passing straight through the accelerator 22 during the interpulse interval and exiting through a grounded guard tube 23 to an electron multiplier 24 producing an output signal 25 which may be used to verify that an ion beam is present. When the orthogonal accelerator 22 is operated, the path of the ion beam is deflected into a flight tube 26, isolated at high voltage, fitted at each end with aperture restrictor plates 46 and 47, and which has an ion detector 27 located at its distal end. The ion detector may be a multiple channel plate multiplier, an electron multiplier or other device presenting a flat detection plane parallel to the X-Z plane.

Referring to FIG. 2, the orthogonal accelerator 22 and other acceleration regions are illustrated in greater detail, from which it will be noted that the ion beam 21 enters the stage-one chamber 22 through a first aperture 32 and when not deflected it exits through a second aperture 33. In the present embodiment the ion beam will have a depth in the Y dimension of 2 mm. The first-stage chamber 22 is essentially defined by a pair of parallel electrodes 34 and 35 the first of which 34 is a push-out plate and the second 35 is a grid electrode allowing the deflected beam 37 to exit. In the embodiment of FIGS. 1 and 2 the distance from the beam centre to the push-out plate 34 is 1.2 mm and to the first grid 35 is 4.0 mm. The first grid 35 may be held at a slightly positive potential to nullify the field penetration through the grid, while the push-out plate 34 is normally at ground potential but is pulsed to a predetermined positive potential (in the order of +100 V in the present embodiment) to initiate acceleration in the time of flight dimension. When the push-out plate 34 and first grid electrode 35 are both effectively grounded the stage-one chamber 31 defines a field free zone and the ion beam passes through the chamber undeflected. However when an eject pulse is applied to the push-out electrode 34 some of the ions in the stage-one chamber will be accelerated through the first grid 35 into the stage-two chamber 41.

The stage-two chamber 41 is essentially defined by the first grid 35 and a second grid 42 parallel to the first grid. The second grid 42 is connected to a potential $V_f$ which creates a field in the stage-two chamber 41 equal to the field in stage-one when the push out potential is applied. The value of $V_f$ is dependent upon the relative dimensions of the stage-one and stage-two chambers 31 and 41 and in the present embodiment has a value of −93.1 V, with the first and second grids being separated by 5.5 mm. Ions exit from the stage-two chamber through the second grid 42 into the stage-three chamber 44.

The stage-three acceleration chamber is essentially defined by the second grid 42 and a third, high tension, accelerator grid 45 to which a high tension voltage typically in the range of 1 to 10 kV is applied. In the present embodiment this high tension voltage is selected to be −3 kV and the separation between the second and third grids is 12.0 mm. Upon entering the stage-three chamber the ions are rapidly accelerated through the grid 45 and into the flight tube 26 which is at the same potential as the high tension grid 45 and is 1500 mm long in the present embodiment.

Referring back to FIG. 1 the ion beam 21 emerging from the second lens element 19 comprises ions travelling in slightly diverging paths substantially parallel to the xz plane such that the y components of the thermal energies of the various ions have been translated into a fixed range of y displacements and the ions in the beam have little or no thermal velocity in the direction of the orthogonal, or y, axis. Thus the range of thermal velocities in the orthogonal direction may be severely restricted and the loss of resolution due to the energy factor is reduced.

Referring now to FIG. 2, within the stage-one chamber 22 the beam is normally not exposed to electric fields and passes straight through the chamber. However when a potential is applied to electrode 34 a field is set up within the stage-one chamber 22, such that substantially parallel planes of equipotential exist at the centre of the region with the effect that ions distributed transversely of the beam 21 will fall through different potential differences in their path to the grid 35. By correct combination of the physical dimensions of all three chambers and the flight tube and the potentials applied to them the exit velocities of the various ions from the third stage chamber 44 can compensate for the different path lengths travelled by ions distributed spatially in the orthogonal dimension. (W. C. Wiley and I. H. McLaren, Rev. Sci. Instrum., 26, 1150 [1955]).

In this way the inherent thermal energy distribution problem is first largely converted into a spatial distribution problem which is then compensated by the orthogonal accelerator of the present invention.

The geometry and electrical design of the Spectrometer, if it has an ion counting detection system as used in the preferred embodiment, is such that the probability of a single ion entering the flight tube after any one operation of the accelerator should be held at approximately 1 in 10. This is chosen to ensure that the probability of two ions arriving at the ion detector 27 within its dead time is small, as this type of detector cannot distinguish between the nearly simultaneous arrival of single or multiple ions. The frequency with which the push-out pulse may be pulsed is set by the flight time of the heaviest ion entering the flight tube. In embodiments of the present invention it is possible to treat the refilling process for stage-one as a low resolution time of flight analyzer in its own right, thus imposing an upper mass limit on the ions entering the flight tube. Thus heavy ions in the continuous ion beam can be suppressed and the pulse frequency limited only by the heaviest ions of interest.

With the arrangement described above it would be expected that 10,000 operations of the accelerator could be achieved per spectrum, resulting in approximately 1,000 ions being detected.

It will be recognised by persons skilled in the art that numerous variations and modifications may be made to the invention as described above without departing from the spirit or scope of the invention as broadly described.

We claim:

1. A time-of-flight mass spectrometer comprising a source of ions, beam forming means to produce a substantially continuous parallel beam of the ions generated by said source, an ion accelerator arranged to apply an acceleration to the ions of said beam to remove a packet of ions from the beam and accelerate the packet towards a target, the acceleration being orthogonally directed relative to the direction of said continuous beam, and means to measure the times of arrival of the ions subjected to said orthogonally directed acceleration, at a detector located at a predetermined distance from the accelerator, the accelerator comprising at least two parallel planar electrodes disposed about the path of said beam to define a first-stage acceleration chamber, at least one of the electrodes being a grid, and a voltage source connected between said electrodes such that when no voltage is applied the electrodes define a field free region and when a voltage is suddenly applied between the electrodes an electric field will be generated and ions located between said electrodes will be accelerated orthogonally to the direction of the beam, the beam forming means being arranged such that the absolute values of magnitude of velocities of ions in the orthogonal direction are minimized.

2. The mass spectrometer of claim 1 wherein a second-stage acceleration chamber is provided, into which the orthogonally accelerated packet of ions is directed, the second-chamber being defined by the grid electrode and a further plate or grid electrode and containing a permanent electric field of equal strength to the suddenly applied electric field in the first-stage chamber.

3. The mass spectrometer of claim 2 wherein a subsequent main acceleration chamber is provide, into which said deflected packet of ions passes from said second-stage chamber, the third-stage chamber being defined by said further electrode and a high tension electrode, the potential between the further electrode and the high tension electrode being in the range of 1–10 kV.

4. The mass spectrometer of claim 1 wherein focussing means are located between the ion source and the orthogonal accelerator and co-operate with a small aperture to provide the substantially parallel ion beam into the accelerator.

5. The mass spectrometer of claim 2 wherein the dimensions of the first, second and third-stage chambers and the potentials applied to said chambers are arranged to compensate for displacement of ions from the beam center in the orthogonal direction when accelerating the ions in the orthogonal direction such that all ions of the same mass will reach the target at substantially the same time.

* * * * *

US005117107A

REEXAMINATION CERTIFICATE (2392nd)

United States Patent [19]

[11] B1 5,117,107

Guilhaus et al.

[45] Certificate Issued Sep. 13, 1994

[54] MASS SPECTROMETER

[75] Inventors: Michael Guilhaus, Randwick; John H. Dawson, Potts Point, both of Australia

[73] Assignee: Unisearch Limited, Kensington, Australia

Reexamination Request:
No. 90/003,061, May 19, 1993

Reexamination Certificate for:

| | |
|---|---|
| Patent No.: | **5,117,107** |
| Issued: | **May 26, 1992** |
| Appl. No.: | **477,921** |
| Filed: | **Dec. 23, 1988** |

[30] Foreign Application Priority Data

Dec. 24, 1987 [AU] Australia .............................. PI-6079

[51] Int. Cl.$^5$ ........................ B01D 59/44; H01J 49/00
[52] U.S. Cl. ...................................... 250/287; 250/281
[58] Field of Search ............... 250/287, 281, 296, 297, 250/397

[56] References Cited

U.S. PATENT DOCUMENTS

| | | | |
|---|---|---|---|
| 2,938,116 | 5/1960 | Benson et al. . | |
| 3,576,992 | 5/1971 | Moorman et al. . | |
| 3,986,111 | 10/1976 | Sellers | 250/287 |

FOREIGN PATENT DOCUMENTS

| | | | |
|---|---|---|---|
| 1063834 | 8/1959 | Fed. Rep. of Germany . | |
| 780999 | 8/1957 | United Kingdom | 250/287 |
| 1302193 | 1/1973 | United Kingdom . | |

OTHER PUBLICATIONS

O'Halloran et al., Technical Documentary Report No. ASD-TDR-62-844, *Determination of Chemical Species Prevalent in a Plasma Jet*, Apr. 1964.

*Primary Examiner*—Bruce C. Anderson

[57] ABSTRACT

A time of flight mass spectrometer includes in ion source (10) a lens system (18, 19) to focus the ions into a beam (21), an orthogonal accelerator (22) comprising two parallel electrodes one of which is a grid through which ions are deflected into a main accelerator and into a flight tube (26). At the distal end of the flight tube (26) is located an ion detector (27) which enables the measurement of the time of flight of ions from the orthogonal accelerator (22) to the detector (27).

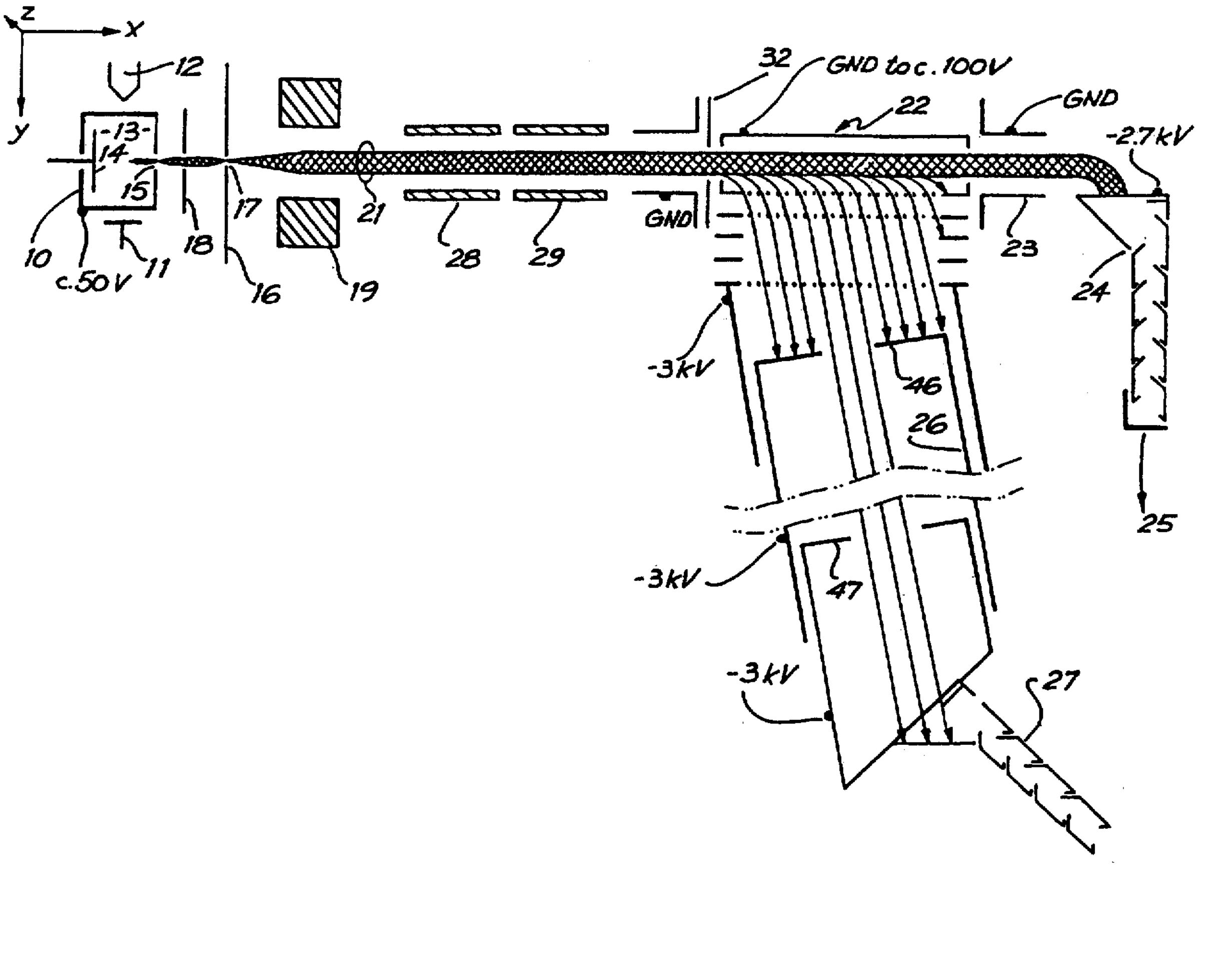

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 38–64:

Referring to FIG. 2, the orthogonal accelerator 22 and other acceleration regions are illustrated in greater detail, from which it will be noted that the ion beam 21 enters the stage-one chamber [22] *31* through a first aperture 32 and when not deflected it exists through a second aperture 33. In the present embodiment the ion beam will have a depth in the Y dimension of 2 mm. The first-stage chamber [22] *31* is essentially defined by a pair of parallel electrodes 34 and 35 the first of which 34 is a push-out plate and the second 35 is a grid electrode allowing the deflected beam 37 to exit. In the embodiment of FIGS. 1 and 2 the distance from the beam centre to the push-out plate 34 is 1.2 mm and to the first grid 35 is 4.0 mm. The first grid 35 may be hald at a slightly positive potential to nullify the field penetration through the grid, while the push-out plate 34 is normally at ground potential but is pulsed to a predetermined positive potential (in the order of +100 V in the present embodiment) to initiate acceleration in the time of flight dimension. When the push-out plate 34 and first grid electrode 35 are both effectively grounded the stage-one chamber 31 defines a field free zone and the ion beam passes through the chamber undeflected. However when an eject pulse is applied to the push-out electrode 34 some of the ions in the stage-one chamber will be accelerated through the first grid 35 into the stage-two chamber 41.

Column 3, lines 31–46:

Referring now to FIG. 2, within the stage-one chamber [22] *31* the beam is normally not exposed to electric fields and passes straight through the chamber. However when a potential is applied to electrode 34 a field is set up within the stage-one chamber [22] *31*, such that substantially parallel planes of equipotential exist at the centre of the region with the effect that ions distributed transversely of the beam 21 will fall through different potential differences in their path to the grid 35. By correct combination of the physical dimensions of all three chambers and the flight tube and the potentials applied to them the exit velocities of the various ions from the third stage chamber 44 can compensate for the different path lengths travelled by ions distributed spatially in the orthogonal dimension. (W. C. Wiley and I. H. McLaren, Rev. Sci. Instrum., 26, 1150 [1955]).

AS A RESULT OF REEXAMINATION, IT HAS BEEN DETERMINED THAT:

Claims 1–3 and 5 are determined to be patentable as amended.

Claim 4 dependent on an amended claim, is determined to be patentable.

New claims 6–10 are added and determined to be patentable.

1. A time-of-flight mass spectrometer comprising a source of ions, beam forming means [to produce a substantially continuous parallel beam of the ions generated by said source] *arranged to form the ions into a beam in which beam the ions have a first velocity component in the direction of the beam and substantially no velocity component orthogonal to the direction of the beam,* an ion accelerator arranged to apply an acceleration to the ions of said beam [to remove a packet of ions from the beam and accelerate the packet towards a target], the acceleration being orthogonally directed relative to the direction of [said continuous] *the* beam,*to remove a packet of ions from the beam by imparting to the packet a second velocity component orthogonal to the direction of the beam such that the packet obtains a resultant velocity directed substantially at a detector, the resultant velocity being a vector sum of the first velocity component and the second velocity component,* and means to measure the times of arrival of the ions subjected to said orthogonally directed acceleration, at [a detector] *the detector, the detector being* located at a predetermined distance from the accelerator, the accelerator comprising at least two parallel planar electrodes disposed about the path of said beam to define a first-stage acceleration chamber, at least one of the electrodes being a grid, and a voltage source connected between said electrodes such that when no voltage is applied the electrodes define a field free region and when a voltage is suddenly applied between the electrodes an electric field will be generated and ions located between said electrodes will be accelerated orthogonally to the direction of the beam [, the beam forming means being arranged such that the absolute values of magnitude of velocities of ions in the orthogonal direction are minimized].

2. The mass spectrometer of claim 1 wherein *the accelerator further comprises* a second-stage acceleration chamber [is provided,] into which the orthogonally accelerated packet of ions is directed, the second-chamber being defined by the grid electrode and a further plate or grid electrode and containing a permanent electric field of equal strength to the suddenly applied electric field in the first-stage chamber.

3. The mass spectrometer of claim 2 wherein [a subsequent] *the accelerator further comprises a third-stage* main acceleration chamber [is provided,] into which said deflected packet of ions passes from said second-stage chamber, the third-stage chamber being defined by said further electrode and a high tension electrode, the potential between the further electrode and the high tension electrode being in the range of 1–10 kV.

5. The mass spectrometer of claim [2] *3* wherein the dimensions of the first, second and third-stage chambers and the potentials applied to said chambers are arranged to compensate for displacement of ions from the beam center in the orthogonal direction when accelerating the ions in the orthogonal direction such that all ions of the same mass will reach the target at substantially the same time.

*6. A time-of-flight mass spectrometer comprising a source of ions, beam forming means arranged to form the*

*ions into a beam in which beam the ions have a first velocity component in the direction of the beam and substantially no velocity component orthogonal to the direction of the beam, an ion accelerator arranged to apply an acceleration to the ions of said beam, the acceleration being orthogonally directed relative to the direction of the beam, to remove a packet of ions from the beam by imparting to the packet a second velocity component orthogonal to the direction of the beam such that the packet obtains a resultant velocity directed substantially at a detector, the resultant velocity being a vector sum of the first velocity component and the second velocity component such that the packet follows a path along a flight tube having an axial direction which diverges from the direction of the beam by less than 90°, the flight tube extending from the accelerator and having the detector located at the distal end thereof, and means to measure the times of arrival of the ions subjected to said orthogonally directed acceleration, at the detector, the detector being located at a predetermined distance from the accelerator, the accelerator comprising at least two parallel planar electrodes disposed about the path of said beam to define a first-stage acceleration chamber, at least one of the electrodes being a grid, and a voltage source connected between said electrodes such that when no voltage is applied the electrodes define a field free region and when a voltage is suddenly applied between the electrodes an electric field will be generated and ions located between said electrodes will be accelerated orthogonally to the directioin of the beam.*

*7. The mass spectrometer of claim 6 wherein the accelerator further comprises a second-stage acceleration chamber into which the orthogonally accelerated packet of ions is directed, the second-chamber being defined by the grid electrode and a further plate or grid electrode and containing a permanent electric field of equal strength to the suddenly applied electric field in the first-stage chamber.*

*8. The mass spectrometer of claim 7 wherein the accelerator further comprises a third-stage main acceleration chamber into which said deflected packet of ions passes from said second-stage chamber, the third-stage chamber being defined by said further electrode and a high tension electrode, the potential between the further electrode and the high tension electrode being in the range of 1–10 kV.*

*9. The mass spectrometer of claim 8 wherein the dimensions of the first, second and third-stage chambers and the potentials applied to said chambers are arranged to compensate for displacement of ions from the beam center in the orthogonal direction when accelerating the ions in the orthogonal direction such that all ions of the same mass will reach the target at substantially the same time.*

*10. The mass spectrometer of claim 6 wherein focussing means are located between the ion source and the orthogonal accelerator and co-operate with a small aperture to provide the substantially parallel ion beam into the accelerator.*

* * * * *